Aug. 11, 1925.  
A. HAGEL ET AL  
1,548,945  
SPRING SUSPENSION  
Filed Dec. 4, 1924
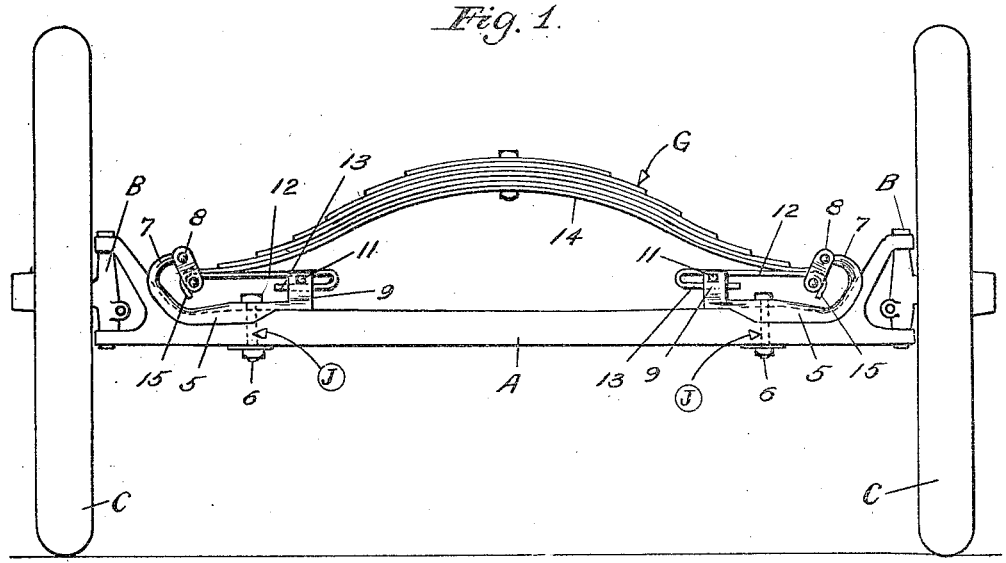
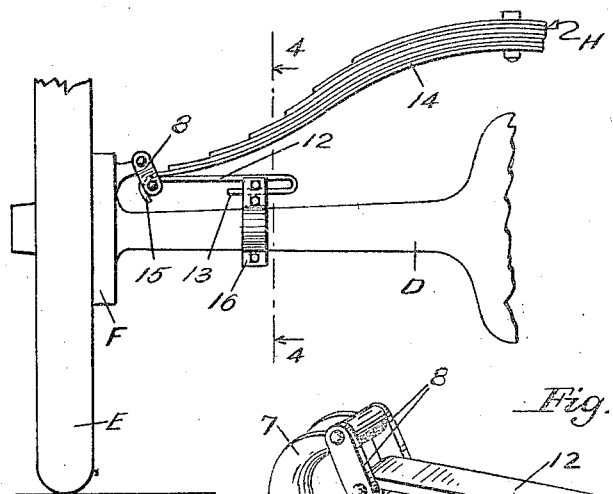
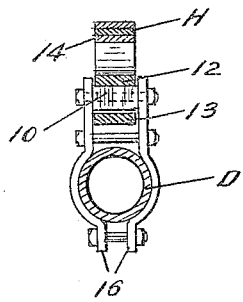
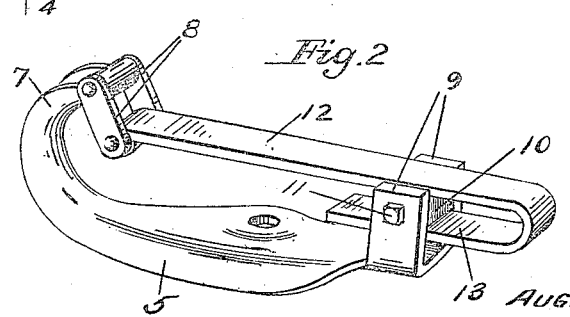
INVENTOR  
AUGUST HAGEL  
JOHN L. HAGEL  
BY  
ATTORNEY Patented Aug. 11, 1925.

1,548,945

UNITED STATES PATENT OFFICE.

AUGUST HAGEL AND JOHN L. HAGEL, OF ST. PAUL, MINNESOTA, ASSIGNORS TO HAGEL WAGON SPRING BOLSTER CO., OF ST. PAUL, MINNESOTA, A CORPORATION OF MINNESOTA.

SPRING SUSPENSION.

Application filed December 4, 1924. Serial No. 753,969.

*To all whom it may concern:*

Be it known that AUGUST HAGEL and JOHN L. HAGEL, citizens of the United States, residing at St. Paul, in the county of Ramsey and State of Minnesota, have invented certain new and useful Improvements in Spring Suspensions, of which the following is a specification.

This invention relates to spring suspensions for motor vehicles and the main object is to provide a simple, efficient and practical spring attaching construction in which is provided means whereby the effective span of the spring will become shorter, and thereby stiffer and of greater strength, when a heavy load is being carried than when the vehicle is empty or only lightly loaded. A further object is to so construct the suspension parts that the secondary or short span bearings for the spring will be connected to the spring in such a manner that it will move longitudinally with it and its shackles, and thereby effect a proper oscillating movement to and with the spring as the latter is fluctuated under a heavy strain or load. Further and more specific objects will be disclosed in the course of the following specification, reference being had to the accompanying drawing, in which:

Figure 1 is an elevation of a front axle and spring construction embodying our invention.

Figure 2 is an enlarged perspective detail view of the spring supporting device which we apply as an attachment to an ordinary front axle to carry out our invention.

Figure 3 is an elevation showing a slight modification of our device whereby it is adapted for convenient application to the rear axle and spring of the car.

Figure 4 is an enlarged detail section on the line 4—4 in Figure 3.

Referring to the drawings more particularly and by reference characters, A designates a common type of front axle, having spindles B and carried by the wheels C, while D designates an ordinary rear axle housing on which is mounted the drive wheel E and brake F, all of which parts are of common and well known construction.

The invention may be applied to either springs of the transversely or longitudinally arranged type, but for purpose of illustration we have only illustrated spring assemblies G and H which are longitudinally arranged with respect to the axles A and D. In cars of this type the springs are usually shorter than those shown in the drawing and are connected (for instance to the front axle) by hangers or shackles to perches which are secured in the holes J of the axle.

When applying our construction (to the front axle) we remove the usual perches and hangers (not shown) and substitute therefor saddles 5 which are secured by bolts 6 in the holes J. These saddles fit snugly and tightly to the axle and are provided, at their outer ends, with gooseneck extensions 7, to which are connected shackles or hangers 8. The inner ends of the saddles are provided with integral ears 9 which extend upwardly and are connected by bearing blocks 10, secured by bolts 11 which extend through the blocks and ears. The outer ends of a pair of bearing plates 12 are connected to the lower ends of the hangers 8, while their inner ends are substantially U-shaped and slidably engage over the blocks 10, the lower arms 13 being arranged to guide between the ears 9 and to hold the inner ends of the bearing plates down upon the blocks 10. The lower leaf 14 of the spring G, which spring is necessarily longer than the normal or ordinary spring and will therefore permit less tilting of the car, is provided with hooked extensions 15 at its ends, which engage over the outer ends of the members 12 and are of course carried primarily by the hangers or shackles 8. In the case of the rear suspension, the construction, it will be noted, is quite similar to the front construction just described. In this event the outer end of the member 12 may be secured either to the normal hanger or to a substituted hanger, and the inner end is slidably secured between two brackets 16, which are bolted over the axle housing D and carry the bearing block 10.

It will now be seen that when the car is traveling over a comparatively smooth road or has a light or relatively light load, it will be carried directly by the shackles or hangers 8. But when the car is heavily loaded or is traveling over bumpy roads and is subject to strenuous rebounds then the spring G (or H) is depressed and each of its outer end portions is brought into contact with the entire upper surface of the adjacent member 12. This not only relieves the outer (and weaker) ends of the springs from the excessive strain, but also moves the effective spring end centers from the shackles 8 to the bearing blocks 10, and thus transfers or confines the load or shock to the intermediate or stronger portion of the spring. It will also be noted that as the member 12 is attached to and moves with the shackle 8 it will also fluctuate or yield in unison with the spring and therefore when the spring is in full engagement with the plate there will be no rubbing or frictional engagement between the two as the spring yields or works out and in.

It is understood that various modifications may be made in the general design and structural details of the invention as herein illustrated and described, providing, however, that such modifications come within the spirit and scope of the appended claims.

Having now therefore fully shown and described our invention what we claim to be new and desire to protect by Letters Patent is:—

1. The combination with a vehicle spring, of a hanger movably supporting one end thereof, a bearing member arranged under the spring end and movable therewith as the latter fluctuates with the hanger, said bearing member extending inwardly from the hanger to form a secondary support for the spring when the latter is compressed beyond a predetermined degree.

2. In a spring suspension for motor vehicles, a spring of the laminated type, a link hanger for suspending one end of the spring, a bearing member connected to said hanger and extending inwardly under the spring, the inner end of the bearing member being normally non-engageable with the spring, and means for slidably supporting said inner end of the bearing member.

3. The combination of a spring, a hanger arranged to hold one end of the spring in a self adjusting suspended position, a bearing member arranged inwardly from the hanger and under the spring to form a secondary bearing for the spring when the latter is compressed to a certain limit, said bearing member being mounted for sliding movement in a longitudinal direction with respect to the spring.

4. The combination with a spring having an inclined outer end portion, of a substantially horizontal bearing member connected to and arranged under the outer end of the spring for supporting the same, and means for movably mounting the bearing member.

5. The combination with a spring having an inclined outer end portion, of a substantially horizontal bearing member arranged under said spring portion and connected at its outer extremity to the outer extremity of the spring, said bearing member being movable longitudinally with the spring and arranged to form an auxiliary inner bearing for the spring when the latter is sufficiently compressed.

6. The combination with the spring and axle of a motor vehicle, of a saddle rigidly secured on the axle and having a pair of guides at its inner end, a depending hanger at the outer end of the saddle, a horizontal bearing member supported at one end by said hanger and slidably secured at its other end between said guides, the outer end of said spring being normally carried by the outer end of said bearing member and the hanger.

7. The combination with a spring of the semi-elliptic type, of a pair of depending hangers connected at their lower ends to the ends of a spring, a pair of bearing members connected to said hanger ends and extending inwardly under the springs to form secondary supports therefor when the spring is compressed to a certain degree.

8. The combination with a spring of the semi-elliptic type, of a pair of depending hangers connected at their lower ends to the ends of the spring, a pair of bearing members connected to said hanger ends and extending inwardly under the springs to form secondary supports therefor when the spring is compressed to a certain degree, and supporting elements and guides for slidably supporting and guiding the inner end portion of the bearing members.

In testimony whereof we affix our signatures.

AUGUST HAGEL.
JOHN L. HAGEL.